(12) United States Patent
Paruthi et al.

(10) Patent No.: US 9,436,582 B1
(45) Date of Patent: Sep. 6, 2016

(54) CALCULATING AN IMMEDIATE PARENT ASSERTION STATEMENT FOR PROGRAM VERIFICATION

(71) Applicant: International Business Machines Corporation, Armonk, NY (US)

(72) Inventors: Viresh Paruthi, Austin, TX (US); Mitra Purandare, Zurich (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/944,330

(22) Filed: Nov. 18, 2015

(51) Int. Cl.
*G06F 9/45* (2006.01)
*G06F 11/36* (2006.01)

(52) U.S. Cl.
CPC .................. *G06F 11/3608* (2013.01)

(58) Field of Classification Search
None
See application file for complete search history.

(56) References Cited

U.S. PATENT DOCUMENTS

| 8,397,192 B2 | 3/2013 | Fuhrmann et al. |
| 8,402,439 B2 | 3/2013 | Gulwani et al. |
| 8,707,273 B2 | 4/2014 | Imai et al. |
| 2006/0225061 A1* | 10/2006 | Ludwig ............. G06T 15/005 717/161 |
| 2013/0283101 A1 | 10/2013 | Yang et al. |
| 2014/0298472 A1 | 10/2014 | Kouskoula et al. |
| 2015/0309813 A1* | 10/2015 | Patel ..................... G06F 8/75 703/22 |

OTHER PUBLICATIONS

C.Y.Cho, et al.,"BLITZ: Compositional Bounded Model Checking for Real-World Programs",IEEE, International Conference on Automated Software Engineering, Nov. 11-15, 2013, pp. 1-11.

* cited by examiner

*Primary Examiner* — Chuck Kendall
(74) *Attorney, Agent, or Firm* — Cantor Colburn LLP; Daniel Morris

(57) ABSTRACT

Embodiments include dividing source code for an application into multiple program fragments by generating a control flow graph for the multiple program fragments. The control flow graph represents a graph structure with nodes representing the multiple program fragments and edges representing an execution order of the program fragments. Aspects include searching for a chosen assertion statement within a program fragment, wherein the chosen assertion statement must be satisfied for correct execution of the chosen program fragment. Aspects also include identifying an immediate parent program fragment for the chosen program fragment using the control flow graph and calculating an immediate parent assertion statement for the immediate parent program fragment using the chosen assertion logic statement. The immediate parent assertion statement is an over-approximate pre-condition of the chosen program fragment. The computation of the over-approximate precondition is performed by computing a precondition that satisfies the chosen assertion statement and the particular-precondition.

20 Claims, 4 Drawing Sheets

CALCULATING AN IMMEDIATE PARENT ASSERTION STATEMENT FOR PROGRAM VERIFICATION

BACKGROUND

The present invention relates to information processing apparatus, an information processing method, and a program.

As programs and applications become more complex, it is difficult to determine if the program will function correctly. This may be particularly true if various program libraries are used. Often, such libraries are parts of well-known code repositories or may be sections of code being reused from earlier applications or projects. It may therefore be infeasible for a human to look through all of the sections of the source code to find errors which may cause a program to not function properly. This can lead to unexpected failures of the program or even to security flaws which can be maliciously exploited.

SUMMARY

The invention provides for a computer program product. The computer program product comprises a computer-readable storage medium having program instructions embodied therewith. The computer-readable storage medium is not a transitory signal per se. The program instructions are executable by a processor to cause the processor to perform a method comprising dividing source code for an application into multiple program fragments. In different examples the source code could be spread across different files and/or libraries. The source code may also be written in one or more different programming languages.

The method further comprises generating a control flow graph for the multiple program fragments. The control flow graph is generated for when the application is executed. The control flow graph represents a graph structure with nodes representing the multiple program fragments and edges representing execution order of the multiple program fragments. The control flow graph identifies which of the multiple program fragments are executed and in which order. The method further comprises searching for a chosen assertion statement within a chosen program fragment. The chosen program fragment is selected from the multiple program fragments. The assertion statement must be satisfied for correct execution of the chosen program fragment. The assertion statement could for example be a statement in an assertion macro or another statement which should be satisfied for correct execution of the chosen program for example a statement in an error handling function or routine.

The method further comprises identifying an immediate parent program fragment for the chosen program fragment using the control flow graph. The multiple program fragments represent portions of code or program instructions that when compiled or interpreted would cause a processor to perform specific instructions or tasks. The immediate parent program fragment is a program fragment which represents a portion of the source code which either calls or is executed before the chosen assertion statement. The identification of the immediate parent program fragment is performed by following the edges of the control flow graph. The method further comprises calculating an immediate parent assertion statement for the immediate parent program fragment using the assertion statement. If the immediate parent assertion statement is satisfied in the immediate parent program fragment then the chosen assertion statement is satisfied in the chosen program fragment.

The immediate parent assertion statement is an over-approximate pre-condition of the chosen program fragment. The computation of the over-approximate pre-condition is performed by: computing a particular precondition that satisfies the chosen assertion statement with a solver and over-approximating the particular-precondition using interpolation.

In another aspect the invention may provide for a computer system comprising a memory containing machine-executable instructions and source code for an application or program. The computer system may further comprise a processor for executing the machine-executable instructions. Execution of the machine-executable instructions may cause the processor to perform a method as is described in the above description of the computer program product or as is described in the claims.

In another aspect the invention may provide for a computer-implemented method. The method may comprise the steps as were previously described for the computer program product or are described in the claims. Embodiments of the present invention and/or examples described herein can be freely combined with each other if they are not mutually exclusive.

BRIEF DESCRIPTION OF THE SEVERAL VIEWS OF THE DRAWINGS

In the following embodiments of the invention are explained in greater detail, by way of example only, making reference to the drawings in which.

DETAILED DESCRIPTION

Figure 1:
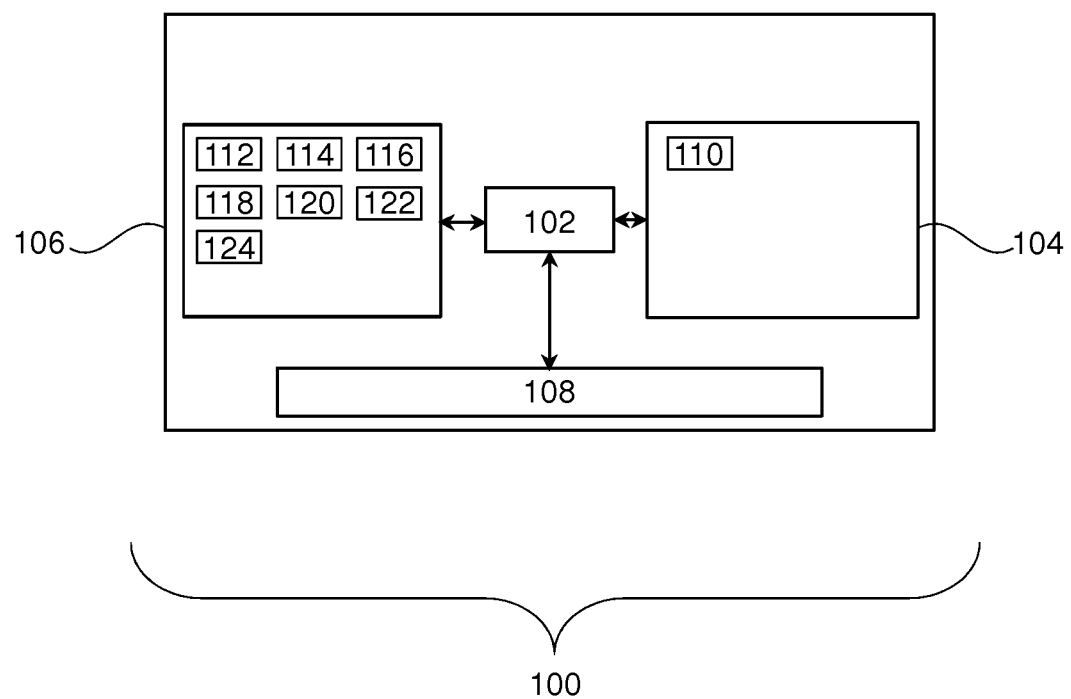
FIG. 1 depicts an example of a computer system.

Some examples may have the advantage that the immediate parent assertion statement may be used for checking for correct execution of a chosen program fragment. This may be true even if multiple libraries or files of source code are used. This may also be true if different languages are combined together to implement the application.

In another embodiment the program instructions further cause the processor to perform the method step of determining if the immediate parent assertion statement is satisfied within the immediate parent program fragment. This may be beneficial in determining if the overall application will execute properly.

In another embodiment the program instructions further cause the processor to perform the method step of determining if the immediate parent assertion statement is satisfied within the immediate parent program fragment using a SAT or SMT solver. An SAT solver is a propositional satisfiability solver. Standard software packages for implementing SAT solvers are available. An SMT solver is a satisfiability modulo theories solver. A number of different commercial and open source SMT solvers are available. The use of an SAT or SMT solver may be beneficial because they may be used to determine automatically if the immediate parent assertion statement is satisfied within the immediate parent program fragment.

In another embodiment the control flow graph has a root node. The control flow graph has nodes which represent multiple program fragments and then edges which represent the execution order. The root node is the first portion of the source code that is either interpreted or executed or the corresponding code after compilation is executed first. The program instructions further cause the processor to perform the method step comprising repeated identification of the immediate parent program fragment and calculating the immediate parent assertion statement and then determining if the immediate parent assertion statement is satisfied within the immediate parent program fragment. This is repeated until either the immediate parent assertion statement is not satisfiable or the root node of the control flow graph is reached.

In other words after the immediate parent assertion statement has been calculated and then verified it may then be used to generate a further immediate parent assertion statement. The resulting immediate parent assertion statements are then recursively propagated to the beginning or root node of the control flow graph. This may be beneficial because it may provide for a means of verifying the chosen assertion statement within execution of the entire program. This may be particularly beneficial if more than one programming language is used.

In another embodiment the program instructions further cause the processor to perform the method step of outputting data identifying the immediate parent program fragment if the immediate parent assertion statement fails to be satisfied in the immediate parent program fragment. In this example program instructions cause the processor to check if the immediate parent assertion statement is satisfied or not within the immediate parent program fragment. If it is not then data which may be useful for a programmer or other operator is output. This may be useful in a programmer debugging or modifying the source code such that the application runs correctly.

In another embodiment the computer system comprises a graphical user interface. The program instructions further cause the processor to perform the method step of displaying the data identifying the calling program fragment on the graphical user interface. This for example may have different forms. The data may specify the line and position of the immediate parent program fragment or it may for example display the immediate parent program fragment or highlight it. This may be beneficial in accelerating the program process and debugging the source code for the application.

In another embodiment calculation of the immediate parent assertion statement for the immediate parent program fragment using the chosen assertion statement at least partially performed by eliminating or unwinding loops and function calls within the chosen parent program fragment. It is also at least partially performed by converting the chosen parent program fragment into single static assignment form. It is also at least partially performed by computing an over-approximate pre-condition for the chosen assertion statement within the chosen parent program fragment that has been converted into static assignment form. This may be beneficial because it may provide for a means of automating the calculation of the immediate parent assertion statement. In another embodiment the solver is a word level or bit level solver that is used at least partially to calculate the particular pre-condition.

In another embodiment the immediate parent assertion statement is an over-approximate pre-condition. This embodiment may be beneficial because it may not be possible to calculate an exact assertion statement or logic statement which would ensure that the chosen program fragment or instructions derived from compiling the chosen program fragment will execute properly. An over-approximate pre-condition ensures that the chosen assertion statement will be satisfied and ensure correct execution of the chosen program fragment.

In another embodiment the control flow graph is generated by tracing program flow and function calls in the source code. This may be beneficial because it may provide a means of automatically generating the control flow graph.

In another embodiment the division of the source code into multiple program fragments is performed using any one of the following: identifying transitions between programming languages, identifying sub-routine calls, identifying function calls, identifying conditional blocks, identifying execution loops, identifying code libraries of the code, identifying sub-routines in the source code, breaking sections of the source code more than a predetermined number of lines or statements into program fragments, breaking sections of the source code which contain more than a predetermined number of statements into program fragments, and combinations thereof. This may provide a means of being able to automatically break the source code into the multiple program fragments.

In one embodiment the control flow graph is a call tree or a call graph. In another embodiment the program instructions further cause the processor to perform the method step of deriving the chosen assertion statement from any one of the following: an argument to an assert macro, an illegal argument exception, a program statement to generate error code, a statement for generating error handling code, and one or more program statements for or invoking an error handler. This embodiment may be beneficial because it may provide an automated means of identifying the chosen assertion statement. In a further embodiment the source code comprises multiple libraries. In another embodiment the source code is written in multiple computer languages.

In one embodiment the program instructions at least partially implement an integrated development environment. This may be beneficial because the identification of portions of the code that cause the chosen program fragment to not function properly may be identified and displayed in the integrated development environment automatically. In another embodiment the program instructions at least partially implement a compiler. That is to say this may be beneficial because the program instructions may be performed as part of the compilation of the application.

FIG. 1 shows an example of a computer system 100. The computer system comprises a processor 102, a memory 104, computer storage 106, and a graphical user interface 108. The contents of the memory 104 and the storage 106 may be exchanged with each other and may also duplicate each other's contents. The memory 104 and the storage 106 may each be considered a computer-readable storage medium. The memory 104 is shown as containing machine-executable instructions 110. The machine-executable instructions 110 may be used to implement an example of the program instructions as are disclosed herein.

The computer storage 106 is shown as containing source code 112. The source code 112 may comprise one or more files containing source code for an application. In some examples the source code 112 may be written in multiple computer programming languages. In some examples the source code 112 may comprise multiple libraries or sources of code also. The computer storage 106 is further shown as containing multiple program fragments 114. The multiple program fragments 114 are sections or portions of code from the source code 112. The multiple program fragments 114 may be actual sections of the source code 112 that are divided or the multiple program fragments 114 may simply be instructions or pointers which indicate where the beginning of the multiple program fragments 114 begin and end. The computer storage 106 is further shown as containing a control flow graph 116. The control flow graph represents a graph structure with nodes representing the multiple program fragments 114 and has edges which represent an execution order of the multiple program fragments 114.

The computer storage 106 is further shown as containing the identification 118 or location of a chosen program fragment 118. The chosen program fragment 118 may for instance be identified automatically by a compiler or the machine-executable instructions 110 because it has a chosen assertion statement 120 within it. The chosen assertion statement 120 is a statement or logic statement which must be satisfied for correct execution of the chosen program fragment 118. For example assert macros in a C programming language may be automatically identified by a compiler or other program and chosen as the chosen assertion statement 120. The computer storage 106 is further shown as containing an identification 122 of an immediate parent program fragment.

The immediate parent program fragment 122 is the program fragment which is executed immediately before the chosen program fragment 118. For example a section of the program could be broken into sections and the immediate parent program fragment would be the portion of the code directly before the chosen program fragment. In other examples the chosen program fragment may be a subroutine or a function which is called by the immediate parent program fragment. The computer storage 106 is further shown as containing an immediate parent assertion statement 124 that was calculated from the chosen assertion statement 120. If the immediate parent assertion statement 124 is satisfied in the immediate parent program fragment 122 then the chosen assertion statement is satisfied in the chosen program fragment 118. For example the immediate parent assertion statement may be an over-approximate pre-condition for the chosen assertion statement 120.

Figure 2:
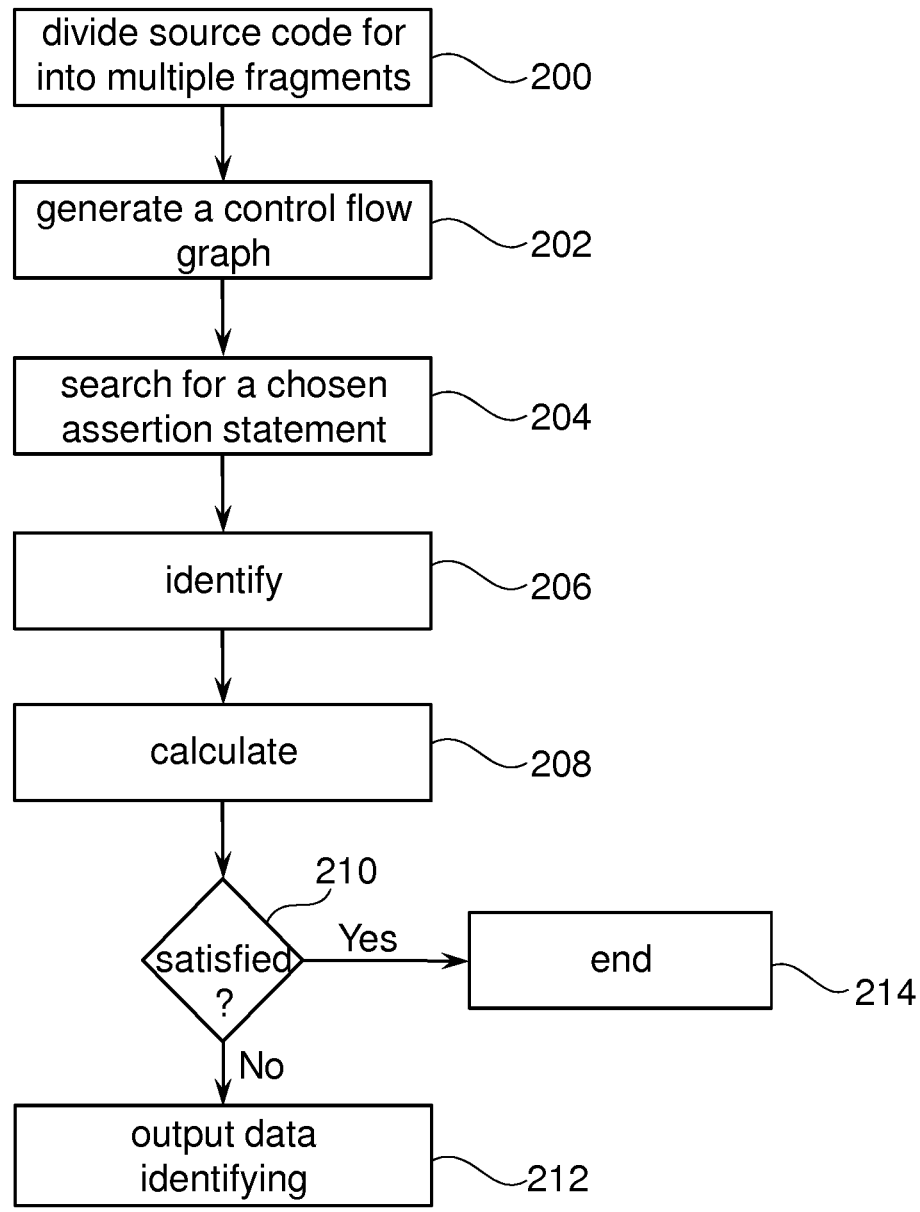
FIG. 2 shows a block diagram which illustrates a method of operating the computer system of FIG. 1.

FIG. 2 shows a flowchart which illustrates a method of operating the computer system 100 of FIG. 1. First in step 200 the source code 112 for an application is divided into multiple program fragments 114. Next in step 202 the control flow graph 116 is generated for the multiple program fragments 114. Next in step 204 a chosen assertion statement is searched for within the chosen program fragment 118. The chosen program fragment is selected from the multiple program fragments. The chosen assertion statement 120 must be satisfied for correct execution of the chosen program fragment 118. Next in step 206 an immediate parent program fragment 122 is identified for the chosen program fragment 118 using the control flow graph 116.

Next in step 206 the immediate parent assertion statement 124 is calculated for the immediate parent program fragment 122 using the chosen assertion statement. Step 210 is a decision box. In step 210 it is determined if the immediate parent assertion statement 124 is satisfied within the immediate parent program fragment 122. If the answer is no then the method proceeds to step 212. In step 212 the processor 102 controls the graphical user interface 108 to display data which identifies the immediate parent program fragment 122. A user or operator of the computer system 100 can then inspect the immediate parent program fragment to see if there is some error or some way to correct the immediate parent program fragment. Returning to step 210, if the immediate parent assertion statement is satisfied within the immediate parent program fragment 122 then the method proceeds to step 214 and the method ends.

Figure 3:
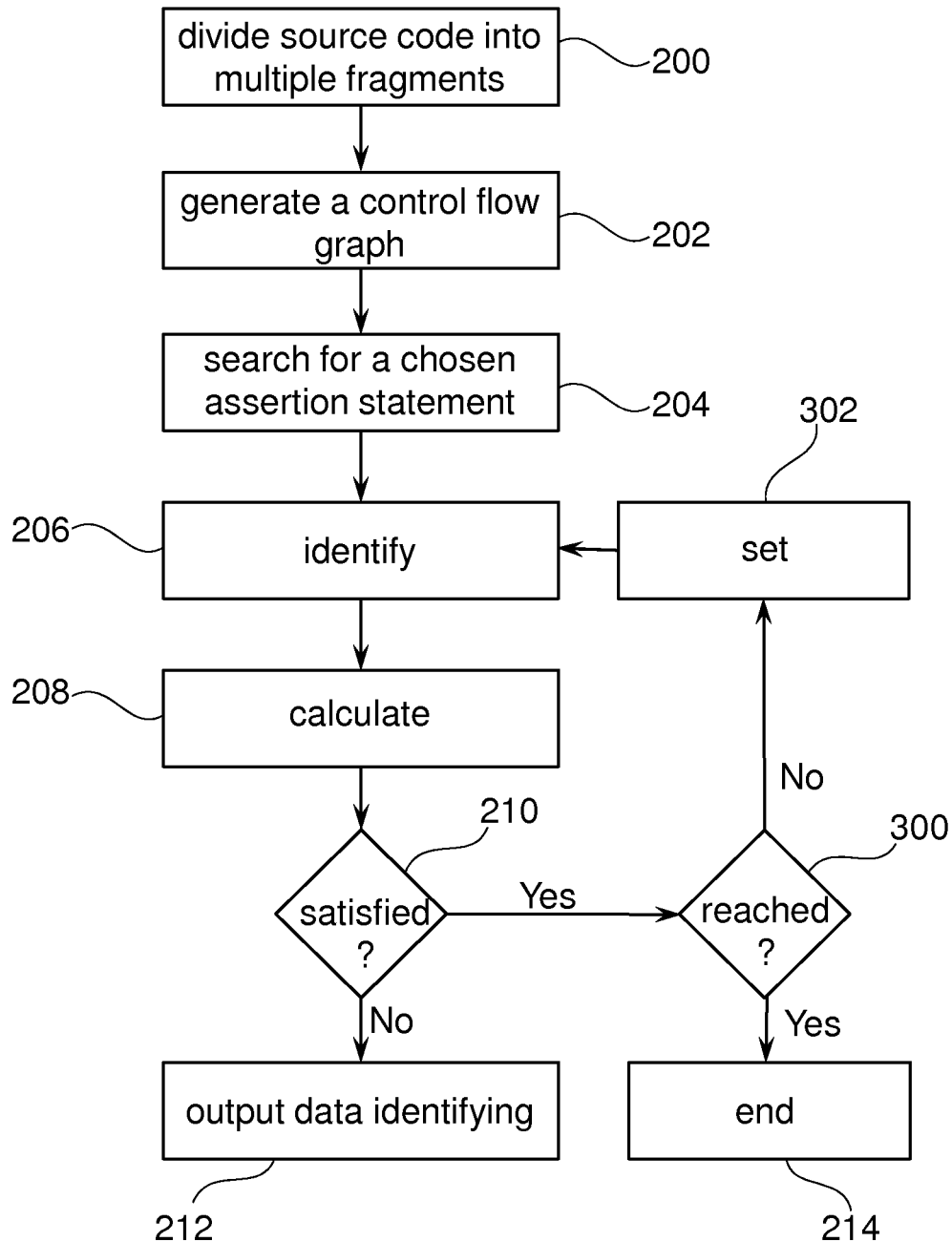
FIG. 3 shows a block diagram which illustrates a further method of operating the computer system of FIG. 1.

FIG. 3 shows a flow chart which illustrates a further example of a method of operating the computer system 100 of FIG. 1. The method shown in FIG. 3 is similar to the method shown in FIG. 2 with several additional steps. Initially the method in FIG. 3 is the same as FIG. 2 through step 210. If in step 210 the immediate parent assertion statement 124 is satisfied within the immediate parent program fragment 122 then the method proceeds to step 300. Step 300 is another decision box. In step 300 it is determined has the method reached the root or a root node of the control flow graph 116. If the answer is yes then the method proceeds to step 214 and the method ends. If the answer is no then the method proceeds to step 302. In step 302 the chosen program fragment 118 is set as being the immediate parent program fragment 122 and the chosen assertion statement 120 is set as being the immediate parent assertion statement 124.

The method then proceeds to step 206 and a new immediate parent program fragment is identified using the control flow graph 116 and the method repeats until either the root node is reached or an immediate parent assertion statement 124 is identified which does not satisfy the immediate parent program fragment 122. The method shown in FIG. 3 propagates the generation of the immediate parent assertion statement until the root node is reached. This is further illustrated in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, JAVA, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
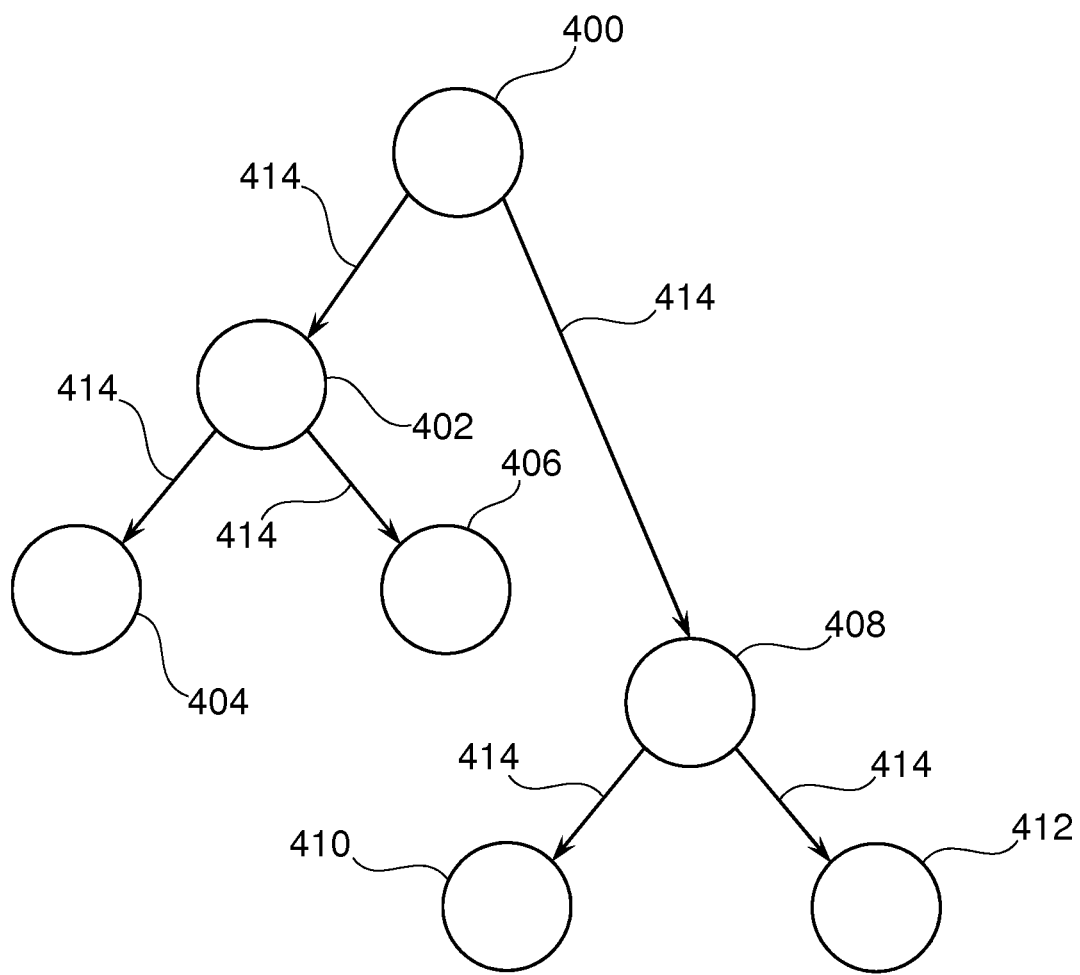
FIG. 4 depicts an example of a control flow graph for an application.

FIG. 4 shows a graphical representation of a control flow graph 116. There are seven nodes which are labeled 400, 402, 404, 406, 408, 414, and 412. There are edges 414 which are used to represent the execution order. When looking at a particular node the execution order is determined by looking to which node is to the left in this particular graphical representation. In this representation node 400 is the root node. Next the program fragment associated with node 402 is executed. The program fragment executed by node 404 is executed next. After this the node labeled 406 is executed. Next node 408 is executed. Next node 410 is executed. Next node 412 is executed. The edges between the nodes 400, 402, 404, 406, 408, 410, 412 are labeled 414.

When performing the method of FIG. 2 or 3 the compiler or other program may inspect each node 400, 402, 404, 406, 408, 410, 412 and inspect it to see if that particular node has an assertion statement which can be identified. For the sake of argument it is assumed that the machine-executable instructions or compiler identifies an assertion statement in node 410. The assertion statement within node 410 is then identified or labeled as the chosen assertion statement 120. Next the control flow graph 116 is used to identify the immediate parent assertion statement 124. In this case the immediate parent assertion statement is node 408. Then the immediate parent assertion statement 124 is calculated for node 408 using the chosen assertion statement 120. It is then checked to see if the immediate parent assertion statement 124 is valid within the immediate parent program fragment 122 which is represented by node 408. If the immediate parent assertion statement 124 is not valid then an error is flagged and this may be logged or may be brought to the attention of a user.

If the immediate parent assertion statement 124 is satisfied within node 408 then the method may then go higher on the control flow graph. The immediate parent assertion statement to node 408 is the root node 400. The immediate parent assertion statement 124 of node 408 is then set to be in the chosen assertion statement 120 for node 408 and the immediate parent assertion statement 124 for node 400 is then calculated. If this new immediate parent assertion statement 124 is satisfied by the root node 400 then it can be assumed that the chosen assertion statement 120 within node 410 will be satisfied and the computer program should function properly. In this process only the immediate parents to the node were traced. It was not necessary to calculate an equivalent assertion statement for nodes 402, 404, 406, or 412.

Examples may address formal co-verification of designs expressed in multiple different languages, without translation to a single representation or language. For a variety of reasons, it may not be possible to express a design in a single language because: it is common for programs to use a library available in a different language, the legacy code in a different language cannot be rewritten due to lack of time, manpower, etc., and part of the design written by people with different expertise.

There are tools available to formally verify designs expressed in a single language. However, there are hardly any tools available to formally verify designs expressed in multiple languages.

Some examples may use compositional verification via precondition computation and verification to verify multilingual designs avoiding translation to one common language or representation.

In some examples a method addresses co-verification without converting the design to a common representation (abstraction) which enables us to use already available model checking technology for co-verification. One potential of the main advantages of some examples may be a clear division of co-verification task into independent verification tasks for the designs.

For simplicity, consider a program containing a caller function calling another function, the callee. Both functions are written in different languages and the callee contains an assertion that should never be violated for correct execution or a formula that describes a correctness condition that should always be satisfied. Our method relies on computing precondition for such that if, the assertion is never violated in any execution of F.

Consider the program shown in Example 1, below. The function callee contains an assertion and assume that for correct execution of the program it is necessary that the arguments to the callee do not result in the assertion being violated. Example 1:

```
int caller(int a, int b)         int callee(int c, int d)
{                                {
    int c = a + b;                   int e = c − d;
    int d = a − b;                   assert (e >= 0);
    return callee(c,d);              return e;
}                                }
```

It is easy to see that the pre-condition for the function callee so that the assertion is never violated by the caller is c−d>=0, i.e., c>=d. Any calling function that satisfies this pre-condition, will not violate the assertion. The simple function caller given in Example 1 satisfies this pre-condition and hence, never violates the assertion.

This disclosure presents a method to compute over-approximate pre-conditions for the callee so that the assertion cannot be violated by the caller. The caller function can be checked for the pre-condition satisfaction.

If we consider software programs, unwinding a program P to a certain depth k is a standard procedure in Bounded Model Checking of programs. The statements in the unwinding are translated to Single Static Assignment (SSA) form, e.g., x=x+1 is translated. Loops are unrolled. Let $\phi$ be the assertion in the program, i.e, assert($\phi$). The condition $\phi$ should always be satisfied. The error states are $\phi$.

Consider the function callee shown in Example 1. A simple unwinding is as follows:

Let E($f$) be the part of the unwinding related to the assertion, i.e., error condition in a function or a program fragment. For the above example, . . . Let T($f$) be the rest of the unwinding. At this point, T($f$)∧E($f$) can be either converted to propositional logic and checked for satisfiability by a SAT solver, or by an SMT solver. If T($f$)∧E($f$) is satisfiable, the solver returns a satisfying assignment. The above formula is satisfiable and the solver may return a satisfying assignment $e_1=-2$, $c_0=2$, $d_0=4$.

Given a function F containing an assertion $\phi$, Algorithms 2 and 3 below illustrates how to obtain an over-approximate pre-condition which does not result in violation of $\phi$. The function F is unwound to sufficient depth so that $\phi$ is reachable. For the purpose of this algorithm, we assume that all loops can be statically unrolled/unwound. We assume that all loops are unwound fully. An assertion in a loop results in multiple assertions after unwinding and each assertion is treated separately for pre-condition computation.

A naïve way to obtain the pre-condition s.t. the assertion is not violated is to collect all the satisfying assignments of T(F)∧G(F) as shown in Algorithm 1 below. Algorithm 1 is computationally expensive.

---

Algorithm 1 NAIVEPRECOND

Input: A function F containing an assertion assert($\phi$), a depth k for unwinding F so that $\phi$ is reachable and not violated
Output: An overapproximate precondition $\hat{p}$ for F such that $\phi$ is not violated
1: $\hat{p}$ = false
2: Let T(F) ∧ G(F) be a satisfiable unwinding of F of depth k,
    G(F) = ¬E(F) representing good states
3: for each satisfying assignment σ of T(F) ∧ G(F) do
4:     ψ = inp(σ, F), i.e., restrict σ to input variables of F
5:     $\hat{p}$ = $\hat{p}$ ∨ ψ
6: end for
7: return $\hat{p}$

---

A better way is to approximate the satisfying assignment σ of T(F)∧G(F) and telling the SAT solver to give a new satisfying assignment which is not in the approximation. Algorithm 2 below illustrates this concept. A satisfying assignment to T(F)∧G(F) is restricted only to the input variables of F in Line 6. Observe that ψ'∧T(F)∧G(F) is unsatisfiable, assuming that the program is deterministic. The satisfiability check on Line 7 returns result=unsatisfiable and a proof of unsastifiability π. This step can be done using a propositional satisfiability solver or a SMT solver. Line 8 uses the proof of unsatisfiability to approximate ψ'. The SAT solver now checks if there is a satisfying assignment to T(F)∧G(F) which is not in (Line 4).

---

Algorithm 2 OVERAPPROXPRECOND1

Input: A function F containing an assertion assert($\phi$), a depth k for unwinding F so that $\phi$ is reachable and not violated
Output: An overapproximate precondition $\hat{p}$ for F such that $\phi$ is not violated
1: $\hat{p}$ = false
2: Let T(F) ∧ G(F) be a satisfiable unwinding of F of depth k,
    G(F) = ¬E(F) representing good states
3: while true do
4:     if ¬$\hat{p}$ ∧ T(F) ∧ G(F) is SAT then
5:         Let SAT solver return a satisfying assignment σ
6:         ψ = inp(σ, F), i.e., restrict σ to input variables of F
7:         (result, π) = solve(ψ ∧ T(F) ∧ E(F))
8:         ψ' = approximate(ψ, π)

---
Algorithm 2 OVERAPPROXPRECOND1
---
9:     $\hat{p} = \hat{p} \vee \psi'$
10:   end if
11:   end while
12:   return $\hat{p}$
---

A satisfying assignment to $T(F) \wedge G(F)$ is restricted only to the input variables of F in line 4. Observe that $\psi' \wedge T(F) \wedge \neg G(F)$ is unsatisfiable, assuming that the program is deterministic. The satisfiability check on Line 7 returns result=unsatisfiable and a proof of unsastisfiability $\pi$. This step can be done using a propositional satisfiability solver or a SMT solver. Line 8 uses the proof of unsatisfiability to approximate $\psi'$. This is continued until a fixed point is reached (Line 5). Each satisfying assignment for $T(F) \wedge G(F)$ is approximated in this manner (Line 3), effectively over-approximating the pre-condition.

Another variant of Algorithm 2 is to approximate $\psi$ till a fixed point is reached. This is illustrated below on Line 5 in Algorithm 3.

---
Algorithm 3 OVERAPPROXPRECOND2
---
Input: A function F containing an assertion assert($\phi$), a depth k for unwinding F so that $\phi$ is reachable and not violated
Output: An overapproximate precondition $\hat{p}$ for F such that $\phi$ is nor violated
1:   $\hat{p}$ = false
2:   Let $T(F) \wedge G(F)$ be a satisfiable unwinding of F of depth k
3:   for each satisfying assignment $\sigma$ of $T(F) \wedge G(F)$ s.t. $\sigma \notin \hat{p}$ do
4:      $\psi'$ = inp($\sigma$, F), i.e., restrict $\sigma$ to input variables of F
5:      $\psi$ = false
6:      while $\psi \neq \psi'$ do
7:         $\psi = \psi'$
8:         (result, $\pi$) = solve($\psi \wedge T(F) \wedge E(F)$)
9:         $\psi'$ = approximate($\psi$, $\pi$)
10:     end while
11:     $\hat{p} = \hat{p} \vee \psi$
12:   end for
13:   return $\hat{p}$
---

Algorithm 3 can be used in program checking in various scenarios. We now describe two several algorithms that use Algorithm 3 for program checking.

Algorithms 2, 3, and 4 below show one ways in which Algorithm 1 can be used. In Algorithm 4 below, consider a function $F_1$ calls function $F_2$ and both the functions are written in different languages.

---
Algorithm 4 VERIFY
---
Input: A program P comprising of caller function $F_1$ and the callee $F_2$ containing an assertion assert($\phi$)
Output: correct or inconclusive
1:   $\hat{p}_2$ = OVERAPPROXPRECOND($F_2$, $\phi$)
2:   if $F_1 \models \hat{p}_2$ then
3:      return correct
4:   else
5:      return inconclusive
6:   end if
---

Examples may also provide for a generalized algorithm for model checking programs. This is illustrated in Algorithms 5 and 6 below. Let us assume the program P is divided into fragments according to some criterion, e.g., function boundaries, number of statements etc. Let $f$ be the program fragment that contains an assertion $\Phi$. The algorithm uses over-approximate pre-condition for satisfaction of to check if is satisfied in P. The over-approximate pre-condition must be satisfied at the end of the immediate parent. Hence, this pre-condition can be seen as an assert statement. An over-approximate pre-condition can be computed, in turn, for the new assertion and is added as an assertion in its parent. This is continued till either the start of the program is reached or the pre-condition is violated. If the pre-condition is violated, there is nothing conclusive to report.

---
Algorithm 5 VERIFY
---
Input: A program P containing a fragment $f$ with an assertion assert($\phi$)
Output: correct or inconclusive
1:   $\hat{p}_f$ = OVERAPPROXPRECOND($f$, $\phi$)
2:   return DFS($f$, $\hat{p}_f$)
---

---
Algorithm 6 DFS
---
Input: a fragment $f_{child}$ with approximate pre-condition $\hat{p}_{f_{child}}$
Output: correct or inconclusive
1:   for each $f_{parent}$ in parents($f_{child}$) do
2:      Add as assertion assert($\hat{p}_{f_{child}}$) to $f_{parent}$ as a post-condition, i.e., $G(f_{parent}) = \neg E(f_{parent}) = \hat{p}_{f_{child}}$
3:      Unwind $f_{parent}$ to enough depth
4:      (result, $\pi$) = solve($T(f_{parent}) \wedge G(f_{parent})$)
5:      if result = satisfiable then
6:         if $f_{parent}$ = program start then
7:            result = correct
8:         else
9:            $\hat{p}_{f_{parent}}$ = OVERAPPROXPRECOND($f_p$, $\hat{p}_{f_{child}}$)
10:           result = DFS($f_{parent}$, $\hat{p}_{f_{parent}}$)
11:        end if
12:     else
13:         result = inconclusive
14:     end if
15:     if result = inconclusive then
16:        break;
17:     end if
18:   end for
19:   return result
---

Some examples may incorporate one or more of the following: specifying a property that the software program code is expected to satisfy; dividing the software program into fragments; eliminating/unwinding loops and function calls and recursions in each fragment; converting the statements and property in the fragments into a logical formula using Static Single Assignment (SSA) form; computing Over-approximate pre-condition of the fragment containing the property so that the property is not violated; checking if the immediate parent fragments satisfy the over-approximate pre-condition and in turn compute over-approximate pre-conditions for immediate parent fragments; performing the check step in a recursive manner until start of program is reached; and signaling if the property is satisfied by the software program.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product, the computer program product comprising a computer readable storage medium having program instructions embodied therewith, wherein the computer readable storage medium is not a transitory signal per se, the program instructions being executable by a processor to cause the processor to perform a method comprising:
dividing source code for an application into multiple program fragments;
generating a control flow graph for the multiple program fragments, wherein the control flow graph represents a graph structure with nodes representing the multiple program fragments and edges representing an execution order of the multiple program fragments;
searching for a chosen assertion statement within a chosen program fragment, wherein the chosen program fragment is selected from the multiple program fragments, wherein the chosen assertion statement must be satisfied for correct execution of the chosen program fragment;

identifying an immediate parent program fragment for the chosen program fragment using the control flow graph; and calculating an immediate parent assertion statement for the immediate parent program fragment using the chosen program fragment and the chosen assertion statement, wherein if the immediate parent assertion statement is satisfied in the immediate parent program fragment then the chosen assertion statement is satisfied in the chosen program fragment, wherein the immediate parent assertion statement is an over-approximate pre-condition of the chosen program fragment, wherein the computation of the over-approximate pre-condition is performed by: computing a particular precondition that satisfies the chosen assertion statement with a solver and over-approximating the particular-precondition using interpolation.

2. The computer program product of claim 1, wherein the program instructions further cause the processor to perform the method step comprising determining if the immediate parent assertion statement is satisfied within the immediate parent program fragment.

3. The computer program product of claim 1, wherein the program instructions further cause the processor to perform the method step comprising determining if the immediate parent assertion statement is satisfied within the immediate parent program fragment using a SAT or SMT solver.

4. The computer program product of claim 2, wherein the control flow graph has a root node, wherein the program instructions further cause the processor to perform the method steps comprising repeated identification of the immediate parent program fragment and calculating the immediate parent assertion statement, and determining if the immediate parent assertion statement is satisfied within the immediate parent program fragment until either the immediate parent assertion statement is not satisfiable or the root node of the control flow graph is reached.

5. The computer program product of claim 2, wherein the program instructions further cause the processor to perform the method step comprising outputting data identifying the immediate parent program fragment if the immediate parent assertion statement fails to be satisfied in the immediate parent program fragment.

6. The computer program product of claim 5, wherein the computer system comprises a graphical user interface, wherein the program instructions further cause the processor to perform the method step comprising displaying the data identifying the immediate parent program fragment on the graphical user interface.

7. The computer program product of claim 1, wherein calculation of the immediate parent assertion statement for the immediate parent program fragment using the chosen assertion statement is at least partially performed by:

eliminating or unwinding loops and function calls within the chosen program fragment; and converting the chosen program fragment into static single assignment form;

computing an over-approximate pre-condition for the chosen assertion statement within the chosen program fragment that has been converted into single static assignment form, wherein the over-approximate pre-condition is the immediate parent assertion statement.

8. The computer program product of claim 1, wherein over-approximating the particular pre-condition using interpolation is at least partially performed by:

converting the chosen program fragment and its chosen assertion into a logical formula using static single assignment form;

solving the logical formula returning a satisfying assignment, wherein a satisfying assignment is a partial pre-condition restricting the partial pre-condition to input variables of the chosen program fragment, converting the chosen program fragment and negation of the chosen assertion statement into a logical formula corresponding to error reachability using static single assignment form; and solving a conjunction of the restricted partial pre-condition and the logical formula corresponding to error reachability resulting in a proof of unsatisfiablility, and computing the over approximate pre-condition using the proof of unsatisfiablility for interpolation.

9. The computer program product of claim 8, wherein over-approximating the particular pre-condition using interpolation is performed repeatedly to over-approximate all possible partial pre-conditions of solving the logical formula corresponding to static single assignment form of the chosen program fragment and its chosen assertion.

10. The computer program product of claim 8, wherein over-approximating the particular pre-condition using interpolation is performed repeatedly for all partial pre-conditions of solving the logical formula corresponding to static single assignment form of the chosen program fragment and its chosen assertion to over-approximate a partial pre-condition until the over-approximation converges to a fixed point, wherein the fixed point is the over approximate pre-condition.

11. The computer program product of claim 1, wherein the control flow graph is generated by tracing program flow and function calls in the source code.

12. The computer program product of claim 1, wherein the division of the source code into multiple program fragments is performed by any one of the following: identifying transitions between programming languages, identifying sub routine calls, identifying function calls, identifying conditional blocks, identifying execution loops, identifying code libraries of the source code, identifying subroutines in the source code, breaking sections of the source code more than a predetermined number of lines into program fragments, breaking sections of the source which contain more than a predetermined number of program statements into program fragments, and combinations thereof.

13. The computer program product of claim 1, wherein the control flow graph is a call tree or a call graph.

14. The computer program product of claim 1, wherein the program instructions further cause the processor to perform the method step comprising deriving the chosen assertion statement from any one of the following: an argument to an assert macro, an illegal argument exception, a program statement to generate error code, a statement for generating error handing code, and one or more program statements for invoking an error handler.

15. The computer program product of claim 1, wherein the source code comprises multiple libraries.

16. The computer program product of claim 1, wherein the source code is written in multiple computer programming languages.

17. The computer program product of claim 1, wherein the program instructions at least partially implement an integrated development environment.

18. The computer program product of claim 1, wherein the program instructions at least partially implement a compiler.

19. A computer system comprising:
  a memory containing machine executable instructions and source code for an application; and
  a processor for executing the machine executable instructions, wherein execution of the machine executable instructions causes the processor to:
    divide the source code into multiple program fragments;
  generate a control flow graph for the multiple program fragments, wherein the control flow graph represents a graph structure with nodes representing the multiple program fragments and edges representing an execution order of the multiple program fragments;
  search for a chosen assertion statement within a chosen program fragment, wherein the chosen program fragment is selected from the multiple program fragments, wherein the chosen assertion statement must be satisfied for correct execution of the chosen program fragment;
    identify an immediate parent program fragment for the chosen program fragment using the control flow graph; and
    calculate an immediate parent assertion statement for the calling program fragment using the chosen assertion statement, wherein if the immediate parent assertion statement is satisfied in the immediate parent program fragment then the chosen assertion statement is satisfied in the chosen program fragment, wherein the immediate parent assertion statement is an over-approximate pre-condition of the chosen program fragment, wherein the computation of the over-approximate pre-condition is performed by: computing a particular precondition that satisfies the chosen assertion statement with a solver and over-approximating the particular-precondition using interpolation.

20. A computer implemented method, wherein the method comprises:
  dividing source code of an application into multiple program fragments;
  generating an control flow graph for the multiple program fragments, wherein the control flow graph represents a graph structure with nodes representing the multiple program fragments and edges representing an execution order of the multiple program fragments;
  searching for a chosen assertion statement within a chosen program fragment, wherein the chosen program fragment is selected from the multiple program fragments, wherein the chosen assertion statement must be satisfied for correct execution of the chosen program fragment;
  identifying an immediate parent program fragment for the chosen program fragment using the control flow graph; and
  calculating an immediate parent assertion statement for the calling program fragment using the chosen assertion statement, wherein if the immediate parent assertion statement is satisfied in the immediate parent program fragment then the chosen assertion statement is satisfied in the chosen program fragment, wherein the immediate parent assertion statement is an over-approximate pre-condition of the chosen program fragment, wherein the computation of the over-approximate pre-condition is performed by: computing a particular precondition that satisfies the chosen assertion statement with a solver and over-approximating the particular-precondition using interpolation.

* * * * *